United States Patent
Ishii

[19]

[11] Patent Number: 5,822,704
[45] Date of Patent: Oct. 13, 1998

[54] MOBILE RADIO UNIT FOR USE IN DUAL-MODE CELLULAR COMMUNICATIONS SYSTEM

[75] Inventor: Junichi Ishii, Tokyo, Japan

[73] Assignee: NEC Corporation, Tokyo, Japan

[21] Appl. No.: 583,702

[22] Filed: Jan. 5, 1996

[51] Int. Cl.⁶ .................................................. H04B 1/38
[52] U.S. Cl. ........................ 455/553; 455/84; 375/216
[58] Field of Search .................................. 455/435, 552, 455/553, 575, 84; 375/216, 281

[56] References Cited

U.S. PATENT DOCUMENTS

| | | | |
|---|---|---|---|
| 4,731,796 | 3/1988 | Masterton et al. | 455/84 |
| 5,020,076 | 5/1991 | Cahill | 375/216 |
| 5,446,422 | 8/1995 | Mattila et al. | 375/216 |
| 5,550,893 | 8/1996 | Heidari | 455/553 |
| 5,642,378 | 6/1997 | Denheyer et al. | 455/553 |

*Primary Examiner*—Edward F. Urban
*Attorney, Agent, or Firm*—Ostrolenk, Faber, Gerb & Soffen, LLP

[57] ABSTRACT

A mobile radio unit having all improved signal processing technique is disclosed. The unit is used in a dual-mode cellular communications system wherein analog and digital channels are used in combination. The mobile radio unit is provided with a front end whereat an incoming radio frequency signal is converted to a corresponding IF. An orthogonal detector is coupled to receive the IF signal and generates in-phase (I) and quadrature (Q) signals. These I and Q signals are respectively digitized by two analog-to-digital (A/D) converters which in turn produce I and Q digital data respectively. A digital signal processor is supplied with the I and Q digital data and demodulates the analog signal using one of the I and Q digital data when the mobile radio unit is using the analog channel while demodulating the digital channel using both the I and Q data when the unit is using the digital channel.

6 Claims, 5 Drawing Sheets

MOBILE RADIO UNIT FOR USE IN DUAL-MODE CELLULAR COMMUNICATIONS SYSTEM

BACKGROUND OF THE INVENTION

1. Field of the Invention

The present invention relates generally to signal processing techniques which have found an application in a dual-mode mobile unit in a cellular mobile radio communications system, and more specifically to a method and apparatus of selectively demodulating one of two signals which are differently modulated and transmitted to a mobile radio unit. The present invention is characterized by effective reduction of circuit components of a dual-mode mobile unit.

2. Description of the Related Art

Since its first introduction in the early 1980s, an analog mobile cellular telephone system has met with enormous success throughout the world. However, due to the ever increasing number of subscribers and the inherent low spectral efficiency, the analog cellular system is rapidly approaching its full capacity.

One approach to making more efficient use of the current spectrum allocation is to convert the analog cellular to digital. Digital technology offers a number of distinct advantages over analog technology, including supporting more traffic per cell, smaller cell radius, enhanced voice quality, etc.

For example, in the United States, the EIA (Electronic Industries Association)/CTIA (Cellular Telecommunications Industry Association) has come up with IS-54: the Dual-Mode Mobile Station-Base Station Compatibility Standard, which requires both the present analog system and the new digital system to coexist until digital replaces the analog cellular system completely. The dual-mode cellular system utilizes digital TDMA (Time Division Multiple Access) which is compatible with the existing analog AMPS (Advanced Mobile Phone Service) and thus shares the existing spectrum.

Each mobile telephone unit deployed in such a dual-mode cellular telephone system has to use analog and digital channels in any combination, even at the same cell site.

Before turning to the present invention, it is deemed preferable to briefly discuss related art with reference to FIGS. 1 and 2.

The present invention is concerned with a receiving portion of a mobile cellular telephone unit and as such, FIG. 1 omits a transmitter portion.

FIG. 1 shows a receiving section of a dual-mode mobile cellular unit 8 which is configured so as to selectively receive a digital π/4 DQPSK (Dual Quadrature Phase Shift Keying) signal or an analog FM (Frequency modulation) signal.

When the mobile unit 8 is initially energized in a given cell, the unit 8 begins to search for a predetermined analog channel via which an analog FM control signal is transmitted. The analog FM control signal applied to the mobile unit 8 via an antenna 10 and a duplexer 12, is tuned and converted to an IF (Intermediate Frequency) signal at a front end 14 using known super-heterodyne or double super-heterodyne techniques.

The IF signal generated from the front end 14 is applied to both an amplifier/limiter 16 and a linear amplifier (IF amplifier) 18. However, when the mobile unit 8 is initially energized, the signal fed to the linear amplifier 18 is blocked at a digital signal processor 24 as mentioned later.

The IF signal applied to the block 16 is amplified and limited in terms of the level thereof. The IF output of the amplitude/limiter 16 is demodulated at a quadrature demodulator 20 in a manner well known in the art. The demodulated signal is digitized at an A/D (analog to-digital) converter 22 and applied to the digital signal processor 24.

Although not shown in FIG. 1, the processor 24 generates a gain control signal which is applied to the amplitude/limiter 16 and the linear amplifier 18. The processor 24 further generates a RSSI (received signal strength indicator) using the gain control signal and applies the RSSI to a CPU (central processor unit) 27 which determines timing of a handoff (for example) using the RSSI.

FIG. 2 is a diagram schematically showing the digital signal processor 24 which includes a plurality of functional blocks.

The digital signal generated from the A/D converter 22 (FIG. 1) is applied to a voice/control signal discriminator 26. Since voice and control signals, both included in the output of the A/D converter 22, are transmitted in separate frequency bands and thus can be discriminated using digital filtering at the discriminator 26. However, in this case (viz., the mobile unit is initially energized), the digital signal from the A/D converter 22 includes only the control signal which is discriminated at the block 26 and applied to the CPU 27 which supervises the overall operations of the mobile unit 8 (FIG. 1).

The control signal includes a plurality of pieces of control information such as channel allocation, transmission power control, handoff control, etc. The control information which is relevant to the present invention is the channel allocation which indicates that the mobile unit 8 should continue to use the FM signal (analog channel) or should be switched over so as to receive π/4 DQPSK signal (digital channel).

If a MTSO (mobile telephone switching office) (not shown) or a has station (not shown) currently associated with the mobile unit 8 instructs that the mobile unit 8 continues to use the FM signal, the voice/control signal discriminator 26, after the unit 8 enters a succeeding speech signal receiving mode, separates voice and control signals. The voice signal selected at the discriminator 26 is subjected to conventional voice signal processing at a block 28 and then applied to a speaker 32 after being converted to the corresponding analog signal at a D/A (digital-to-analog) converter 30 (FIG. 1).

In the above, when the mobile unit 8 is initially energized, the CPU 27 applies a disable signal to a memory 50 and applies an enable signal to the discriminator 26. It is readily understood that if the unit 8 should receive a π/4 DQPSK signal (hereinafter sometimes referred to as QPSK signal), the CPU 27 enables the memory 50 while disabling the discriminator 26.

Returning to FIG. 1, when the mobile unit 8 is instructed to receive a QPSK signal transmitted over a given digital channel, the linear amplifier 18 receives an IF signal which includes the QPSK signal. The IF signal in linearly amplified at the amplifier 18 and applied to an orthogonal detector 34 which includes two mixers 36 and 38 and a π/2 phase shifter 40. The mixer 38 is directly coupled to a local oscillator 42 while the other mixer 36 is coupled, via the phase shifter 40, to the local oscillator 42.

The operation of the orthogonal detector 34 is well known in the art and thus, further descriptions thereof are not given for simplifying the disclosure. If necessary, reference should be made to U.S. Pat. No. 5,268,647 (for example) granted to Osamu Ichiyoshi and assigned to the same entity as the present application.

I and Q (viz., in-phase and quadrature) signals generated from the orthogonal detector 34 are then digitized at A/D converters 44 and 46, respectively.

The digitized I and Q signals from the A/D converters 44 and 46 are successively stored in a memory 50 of the digital signal processor 24 under the control of the CPU 27 (FIG. 2). The I and Q signals stored in the memory 50 are read out, under the control of the CPU 27, in a manner which compensates for (or adjusts) the propagation delay between the two signals as well known in the art. The I and Q signals are demodulated at a conventional π/4 DQPSK demodulator 52 whose output is then decoded at a decoder 54. Since original voice and control signals have been encoded in different bit rates, a discriminator 56 is able to separate the voice and control signals which are then applied to a voice signal processor 98 and the CPU 27, respectively. The voice signal is frequency band limited at the voice signal processor 58, converted to the corresponding analog signal at the D/A converter 30 (FIG. 1), and reproduced at the speaker 32. On the other hand, the control signal applied to tho CPU 27 includes a plurality of pieces of mobile unit control information for channel allocation, transmission power control, etc.

As discussed in the above, the blocks 16, 20 and 22 are dedicated to demodulating the FM signal. However, it is highly desirable to omit these circuits in view of reducing the size of the whole unit, simplifying the circuit configuration, cutting down the cost of the unit, etc.

SUMMARY OF THE INVENTION

It is therefore an object of the present invention to provide a dual-mode mobile cellular unit wherein both digital end analog channel signals are demodulated in a digital signal processor.

Another object of the present invention is to provide a method of demodulating both digital and analog channel signals in a digital signal processor.

More specifically, a first aspect of the present invention resides in a mobile radio unit for use in a dual-mode cellular communications system wherein analog and digital channels are used in combination, comprising: a front end for converting an incoming radio frequency signal to a corresponding IF (intermediate frequency) signal; an orthogonal detector coupled to receive the IF signal and generates in-phase (I) and quadrature (Q) signals; two analog-to-digital (AID) converters for respectively digitizing the I and Q signals and generating I and Q digital data therefrom; and a digital signal processor being supplied with the I and Q digital data, the processor demodulating the analog signal using one of the I and Q digital data when the unit is using the analog channel, and the processor demodulating the digital signal using both the I and Q digital data when the unit is using the digital channel.

A second aspect of the present invention resides in a method of selectively demodulating an analog signal or a digital signal transmitted to a mobile radio unit for use in a dual-mode cellular communications system, comprising the steps of: (a) converting an incoming radio frequency signal to a corresponding IF signal; (b) orthogonally detecting the IF signal and generating in-phase (I) and quadrature (Q) signals; (c) digitizing the I and Q signals and generating I and Q digital data respectively corresponding to the I and Q signals; and (d) processing the I and Q digital data ouch as to demodulate the analog signal using one of the I and Q digital data or the digital signal using both the I and Q data.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

One preferred embodiment of the present invention is discussed with reference to FIGS. 3–5.

Figure 2:
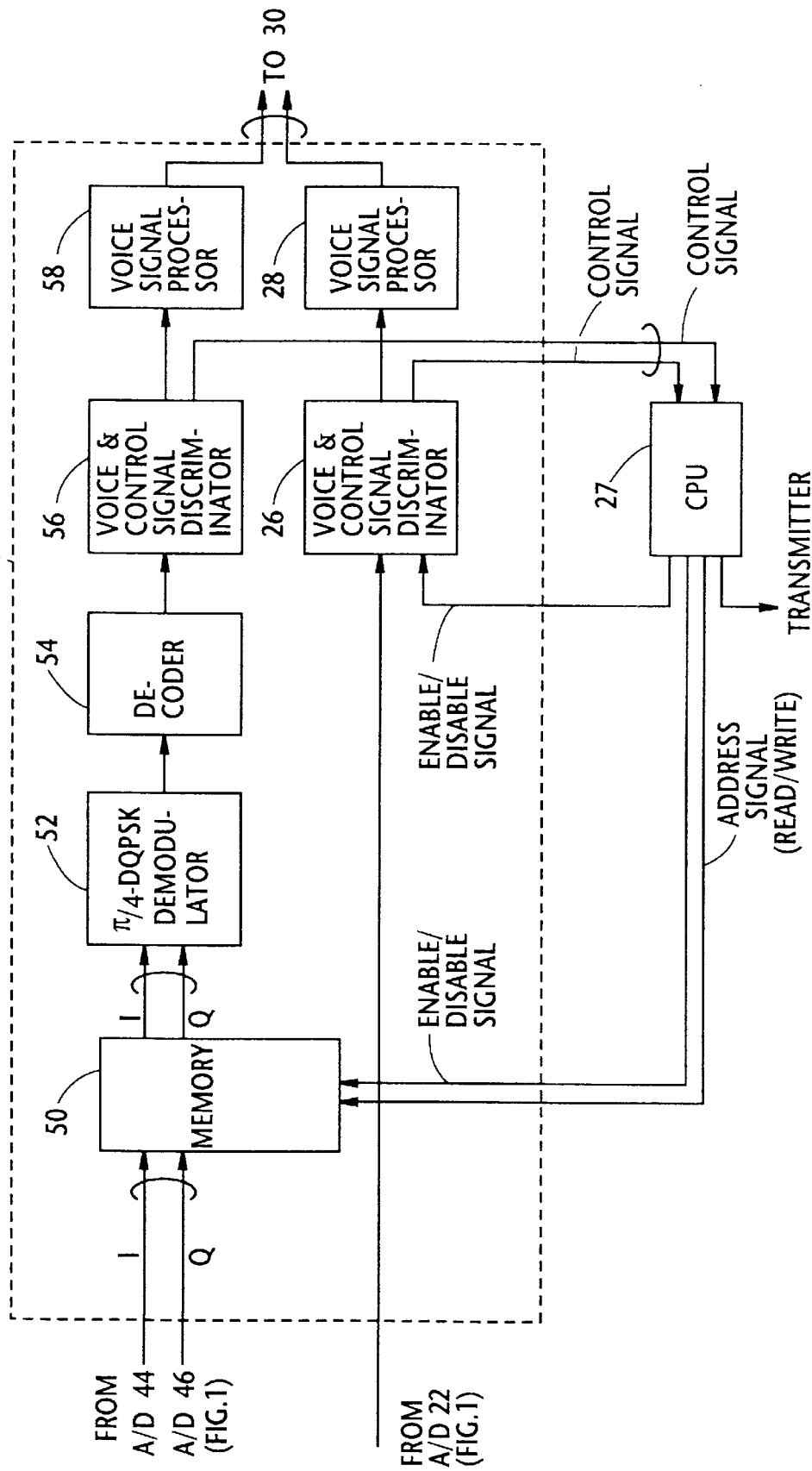
FIG. 2 is a block diagram showing details of a digital signal processor of FIG. 1.
Figure 3:
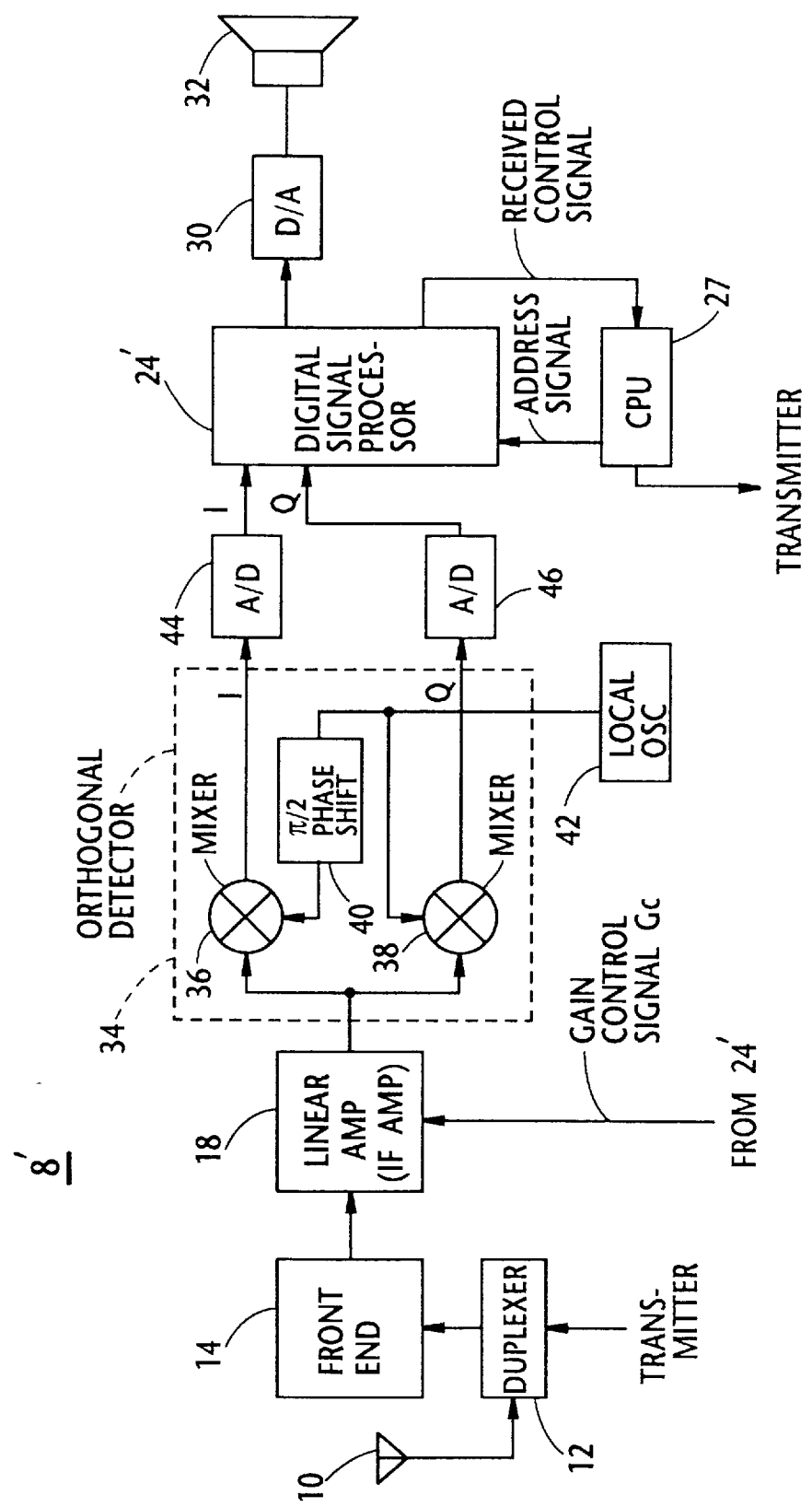
FIG. 3 is a block diagram showing a preferred embodiment of the present invention.
Figure 4:
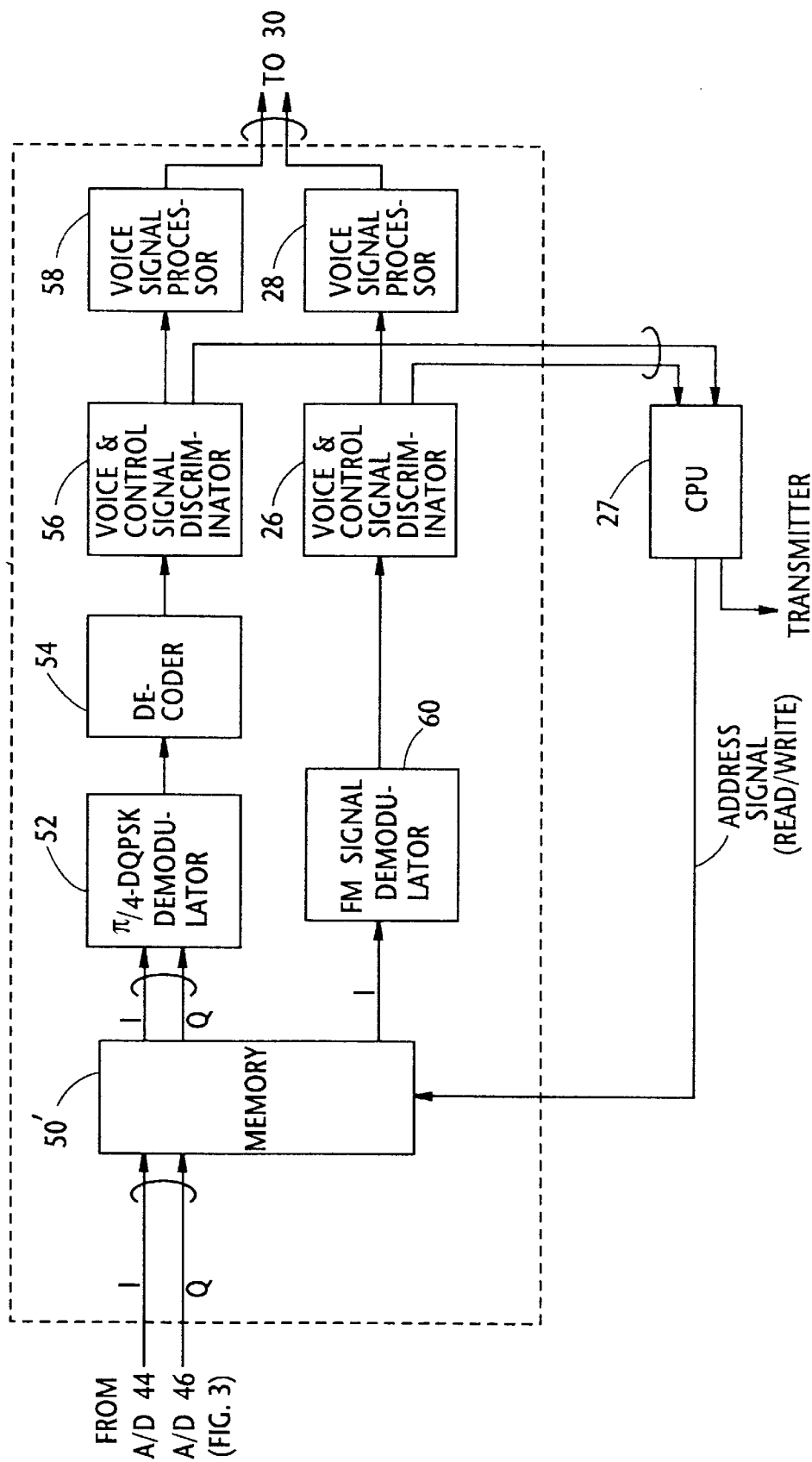
FIG. 4 is a block diagram showing details of a digital signal processor of FIG. 3.

FIG. 3 is a block diagram showing a dual-mode mobile unit 8' embodying the present invention. FIG. 4 illustrates a digital signal processor 24' of FIG. 3 in detail. Each block whose function is similar to the counterpart of the related art (FIGS. 1 and 2), is denoted by the same reference number plus a prime.

Figure 1:
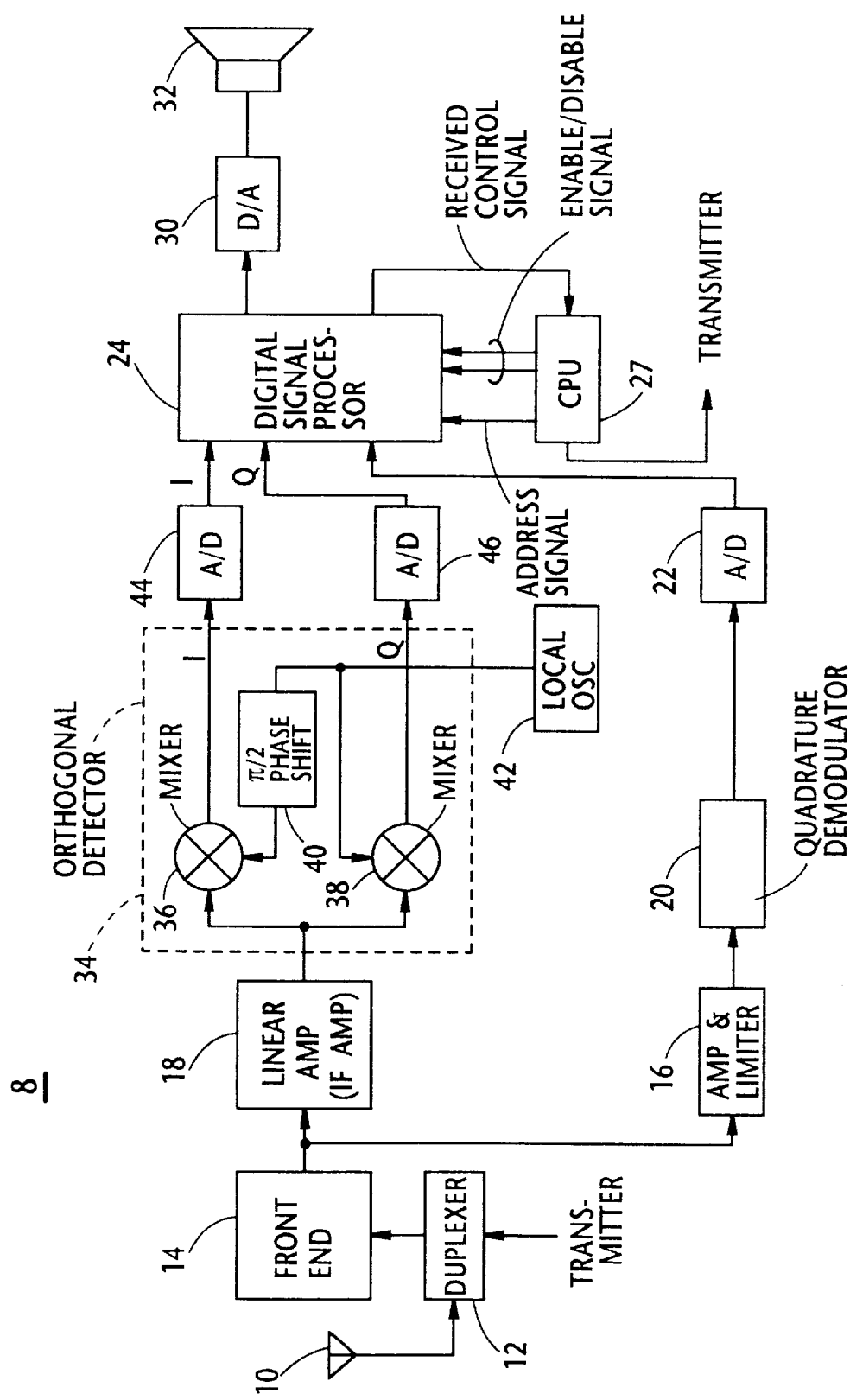
FIG. 1 is a block diagram showing the related art of the present invention, having been referred to in the opening paragraphs of the instant disclosure.

As shown in FIG. 3, the mobile unit 8' is not provided with the amplifier/limiter 16, the quadrature demodulator 20, and the A/D converter 22 all of which are inevitably required with the related art shown in FIG. 1.

As in the related art, when the mobile unit 8' is initially energized while located in a given cell, the unit 8' begins to search for an analog channel which carries an FM control signal indicating whether or not the unit 8' should continue to use the analog channel or be switched over so as to use a digital channel.

The incoming FM signal is tuned and converted to an IF signal at the front and 14, amplified at the linear amplifier 18, and separated into I and Q signals which are then respectively digitized at the A/D converters 44 and 46. The gain of the linear amplifier 18 is controlled by a gain control signal Gc applied from the digital signal processor 24'. The I and Q signals are applied to a memory 50' (FIG. 4) which corresponds to the memory 50 of FIG. 2. It is to be noted that the operation of the unit 8' up to the application of the I and Q signals to the memory 50' (FIG. 4)) is identical with respect to both the FM and QPSX signals.

In the case where the FM signal is to be demodulated in the digital signal processor 24', one of the I and Q signals is used for the FM demodulation. Selecting one of the I and Q signals for FM signal demodulation has previously determined when the mobile unit 8' is designed. In the instant embodiment, the I signal is applied to and FM signal demodulator 60.

Figure 5:
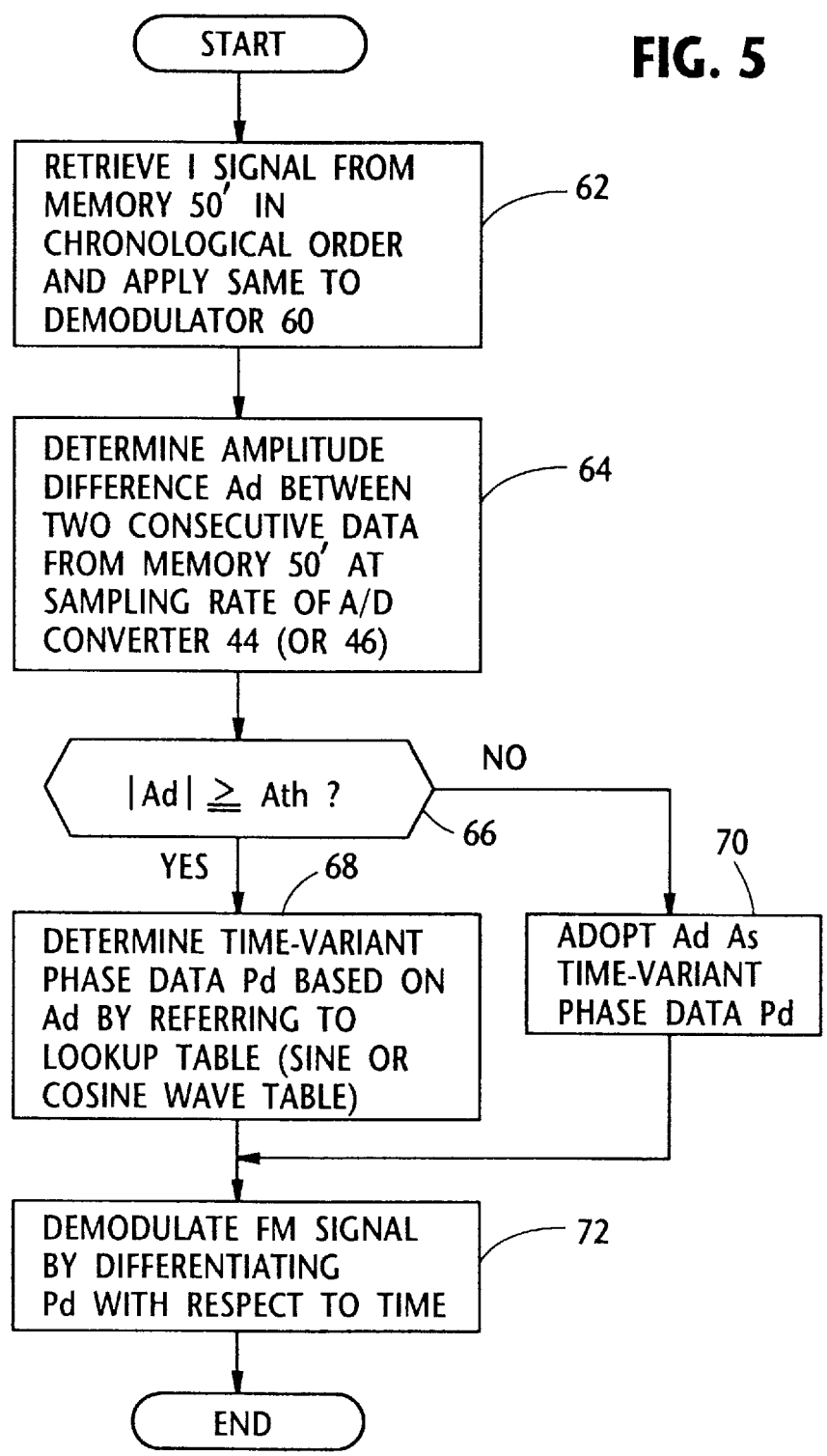
FIG. 5 is a flow chart which shows the steps which characterize the operation of an FM signal demodulator of FIG. 4.

Reference is made to FIG. 5, there is shown a flow chart which includes the steps which characterize the digital demodulation of the FM signal (data) retrieved from the memory 50'.

In FIG. 5, at stop 62, the I signal stored in the memory 50' are read out in chronological order in response to a read address signal from the CPU 27 and applied to the FM signal demodulator 60. More specifically, the I signal are read out of the memory 50' when accumulated to a predetermined amount. At step 64, the FM demodulator 60 determines an amplitude difference Ad between two consecutive data from the memory 50' at a predetermined time interval which corresponds to a sampling rate of the A/D converter 44 (or 46). The amplitude difference per unit time length is practically carried out by subtracting the latter data from the former.

Following this, the absolute value of Ad is compared with a predetermined threshold Ath having a relatively small value. If the absolute value of Ad is equal to or larger than the threshold level Ath, the routine proceeds to step 68, and otherwise (viz., |Ad|<Ath) the routine goes to step 70.

At step 68, a time-variant phase data Pd is determined based on the time-variant amplitude difference Ad by referring to a lookup table wherein a plurality of amplitude data of a sine or cosine wave are listed. This lookup table is previously stored in a suitable ROM (read-only memory) (not shown). On the other hand, at step 70, the time-variant amplitude difference Ad is adopted as the time-variant phase data Pd (viz., using a well known approximate equation of sin0−θ). At step 72, the time-variant phase data Pd is differentiated with respect to time and thus the F signal is demodulated.

The signal or data processing after the FM signal demodulator 60 is identical to that of the related art and hence further descriptions thereof are not given for the sake of simplifying the disclosure.

The QPSK signal is demodulated in exactly the same manner as in the related art discussed with respect to FIGS. 1 and 2.

As mentioned above, with the related art (FIG. 1), the RSSI is derived from the amplifier/limiter 16. However, since the present invention is not provided with the block 16, the RSSI may be obtained using the gain control signal Gc applied to the linear amplifier 18 from the digital signal processor 24'. However, the manner how to generate the gain control signal Gc and the RSSI in the digital signal processor 24' is not described in that the present invention is not directly concerned therewith.

It will be understood that the above disclosure is representative of only one possible embodiment of the present invention and that the concept on which the invention is based is not specifically limited thereto.

What is claimed is:

1. A mobile radio unit for use in a dual-mode cellular communications system wherein analog and digital signals are used in combination, comprising:
    a front end for converting an incoming radio frequency signal to a corresponding IF (intermediate frequency) signal;
    an orthogonal detector coupled to receive said IF signal and generating in-phase (I) and quadrature (Q) signals;
    two analog-to-digital (A/D) converters for respectively digitizing said I and Q signals and generating I and Q digital data therefrom; and
    a digital signal processor being supplied with said I and Q digital data, said processor demodulating said analog signal using one of said I and Q digital data so as to derive a control signal which indicates whether said mobile radio unit should use the analog or digital signal,
    said digital signal processor being responsive to said control signal whereby when said control signal indicates use of said analog signal, said processor continues to demodulate said analog signal using one of said I and Q signals and, when said control signal indicates use of said digital channel, said processor demodulates said digital signal using both said I and Q digital data.

2. A mobile radio unit as claimed in claim 1, wherein said signal transmitted over said analog channel is an FM (frequency modulation) signal, and said signal transmitted over said digital signal is a QPSK (quadrature phase shift keying) signal.

3. A method of selectively demodulating an analog signal or a digital signal transmitted to a mobile radio unit for use in a dual-mode cellular communications system, comprising the steps of:
    (a) converting an incoming radio frequency signal to a corresponding IF signal;
    (b) orthogonally detecting said IF signal and generating in-phase (I) and quadrature (Q) signals;
    (c) digitizing said I and Q signals and generating I and Q digital data respectively corresponding to said I and Q signals;
    (d) demodulating said analog signal using one of said I and Q digital data so as to derive a control signal which indicates whether said mobile radio unit should use the analog or digital signal;
    (e) continuing to demodulate said analog signal using one of said I and Q digital data if said control signal indicates use of said analog signal; and
    (f) switching the mobile radio unit to a digital mode in response to said control signal indicating use of said digital signal and demodulating said digital signal using both said I and Q digital data.

4. A method as claimed in claim 3, wherein said analog signal is an FM signal, and said digital signal is a QPSK signal.

5. A method of selectively demodulating an analog signal or a digital signal transmitted to a mobile radio unit for use in a dual-mode cellular communications system, comprising the steps of:
    (a) converting an incoming radio frequency signal to a corresponding IF signal;
    (b) orthogonally detecting said IF signal and generating in-phase (I) and quadrature (Q) signals;
    (c) digitizing said I and Q signals and generating I and Q digital data respectively corresponding to said I and Q signals;
    (d) demodulating said analog signal using one of said I and Q digital data so as to derive a control signal which indicates whether said mobile radio unit should use the analog or digital signal;
    (e) continuing to demodulate said analog signal using one of said I and Q digital data if said control signal indicates use of said analog signal;
    (f) switching the mobile radio unit to a digital mode in response to said control signal indicating use of said digital signal and demodulating said digital signal using both said I and Q digital data; and further wherein the demodulation of said analog signal at each of steps (d) and (e) includes the steps of:
    (g) storing successively said I and Q digital data in a memory;
    (h) retrieving one of said I and Q digital data from said memory in chronological order;
    (i) determining an amplitude difference between two consecutive digital data at a predetermined time arrival;
    (j) comparing an absolute value of said amplitude difference with a threshold;

(k) determining a time-variant phase data based on said amplitude difference referring to a lookup table if the absolute value of said amplitude difference exceeds said threshold;

(l) determining said amplitude difference as a time-variant phase data if the absolute value of said amplitude is less than said threshold; and (m) differentiating said time variant phase data determined at steps (k) and (l) with respect to time.

6. A method as claimed in claim 5, wherein said lookup table lists amplitude data of a sine wave.

* * * * *